US007385185B2

(12) United States Patent
Dowell et al.

(10) Patent No.: US 7,385,185 B2
(45) Date of Patent: Jun. 10, 2008

(54) MOLECULAR ACTIVATION FOR TANDEM MASS SPECTROSCOPY

(75) Inventors: Jerry T. Dowell, Carson City, NV (US); John Fjeldsted, Redwood City, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 364 days.

(21) Appl. No.: 11/314,592

(22) Filed: Dec. 20, 2005

(65) Prior Publication Data

US 2007/0138383 A1 Jun. 21, 2007

(51) Int. Cl.
*B01D 59/44* (2006.01)
*H01J 49/00* (2006.01)

(52) U.S. Cl. ...................... 250/281; 250/288; 250/282; 250/285; 250/492.3; 250/442.11; 250/292; 250/400; 435/6; 435/15; 435/14; 435/18; 435/105; 436/93; 436/86; 436/94; 436/173

(58) Field of Classification Search ................ 250/281, 250/282, 285, 292, 288, 492.3, 442.11, 400; 435/6, 15, 18, 14, 105; 436/93, 86, 94, 173
See application file for complete search history.

(56) References Cited

U.S. PATENT DOCUMENTS 5,847,386 A 12/1998 Thomson et al.
6,504,150 B1 1/2003 Verentchikov et al.
6,919,562 B1 7/2005 Whitehouse et al.
2004/0011956 A1 1/2004 Londry et al.
2005/0151073 A1 7/2005 Kato

FOREIGN PATENT DOCUMENTS

GB 2301705 12/1996

OTHER PUBLICATIONS

UK Search Report for Application No. GB0625305.8, mailed Jul. 10, 2007, corresponding to U.S. Appl. No. 11/314,592, 1 page.
Sleno et al., “Ion Activation Methods for Tandem Mass Spectrometry”, (2004), Journal of Mass Spectrometry vol. 39, pp. 1091-1112.
S. McLuckey et al., “Slow Heating Methods in Tandem Mass Spectrometry”, (1997), Journal of Mass Spectrometry vol. 32, pp. 461-474.
V. Gabelica et al., “Internal Energy and Fragmentation of Ions Produced in Electrospray Sources”, (2004), Published in Mass Spectrometry Reviews vol. 24, pp. 566-587.

*Primary Examiner*—Jack I. Berman
*Assistant Examiner*—Meenakshi S Sahu

(57) ABSTRACT

In a tandem mass spectrometer means are provided for molecular activation of ions prior to fragmentation. An embodiment of a tandem mass spectrometer comprises a first collision cell receiving analyte ions having an internal energy and a second collision cell situated downstream from the first collision cell wherein the first collision cell increases the internal energy of the analyte ions prior to entry of the ions into the second collision cell, the increase in internal energy imparted in the first collision cell alone being insufficient to fragment a substantial portion of the analyte ions. Another embodiment includes a collision cell with a heating device situated adjacent to the collision cell for controlling the temperature within the collision cell.

38 Claims, 5 Drawing Sheets

MOLECULAR ACTIVATION FOR TANDEM MASS SPECTROSCOPY

FIELD OF THE INVENTION

The present invention relates to mass spectroscopy systems, and more particularly, but without limitation, relates to an apparatus and method for molecular activation of ions in tandem mass spectrometer systems.

BACKGROUND INFORMATION

Tandem mass spectrometers (MS/MS) are used for elucidation of the structure of analyte molecules. In a typical MS/MS system, a parent, or "precursor", molecule is ionized and then selected out of an analyte sample using a first stage mass analyzer. The precursor ions are then transported to a region in which they are subjected to one or more activating influences that excite the ions, which induces fragmentation of the precursor ions into product ions and neutral fragments. The product ions can then be analyzed in the second stage mass analyzer, and the resulting mass spectrum of the product ions can reveal a great deal of information about the structure of the precursor molecule.

Product ions will be observed in the mass spectrum if they are generated by fragmentation at a high rate compared to the length of time that a precursor ion travels through the activation region. Regardless of the activation technique employed, the rate at which fragmentation occurs, referred to as the dissociation rate, is found to depend on the internal energy distribution of the precursor ions. FIG. 1 shows an expected distribution of internal energies of precursor ions in a mass spectrometer instrument. As can be discerned, the precursor ions at higher internal energies have a relatively higher dissociation rate, and are denoted as "unstable".

While FIG. 1 indicates that only a small portion of the total population of precursor ions have high internal energies and dissociation rates, the relative portion of unstable ions is not necessarily static since activation methods can be employed to increase the total internal energy of the ions, in effect shifting the entire curve to the right. There are a number of activation methods available, and one of the more commonly employed techniques is collision-induced dissociation ("CID") (also referred to as collision-activated dissociation (CAD)) in which the precursor ions are subjected to collisions with atoms of neutral particles in a chamber situated between the two mass analyzer stages. The neutral is typically an inert, noble gas such as helium or argon which does not interact chemically with the precursor ions during collisions.

When a precursor ion undergoes an inelastic collision with a neutral particle, part of the kinetic energy of the precursor ion is converted into internal energy, which, at low kinetic energies, usually causes excitation of vibrational states. However, the amount of kinetic energy that can be converted to internal energy is highly dependent on the relative masses of the ion and the neutral according to the formula:

$$E_{conv}=N/(m_p+N)\times KE \qquad (1)$$

where $E_{conv}$ is the maximum energy available for conversion, KE is the kinetic energy of the precursor ion and N and $m_p$ represent the masses of the neutral particle and the precursor ion, respectively. From equation (1), it can be seen that the total energy available for conversion per collision is proportional to the kinetic energy of the ion, that conversion efficiency can be increased by using high mass neutral species, and that the conversion efficiency decreases as the mass of the precursor ion of interest increases.

Ions produced in atmospheric ion sources typically undergo a supersonic expansion as they flow downstream into low pressure regions of the mass spectrometer. The supersonic expansion cools the ions, and their internal energy drops to a very "cold" state even though the kinetic energy of these ions may be high. As the ions are subjected to collisions, the kinetic energy of the collisions gradually thermalizes the ions, raising their internal temperature, and spreading energy among their various internal vibrational modes. As the internal temperature of the ions rise, incipient instabilities in the precursor ions can emerge as certain vibrational modes acquire more energy than they can hold.

Configurations for tandem mass spectrometers at present are often inefficient in producing product ions partly because precursor ions arrive at the collision cells of these instruments with insufficient internal energy due to the cooling effect of the supersonic expansion. Therefore, there exists a need for a method and apparatus for ensuring that the precursor ions are thermalized by the time that fragmentation of the ions is designed to occur. In addition, there exists a need to control the precursor ion activation process so as to enable a variation of the fragmentation patterns by selectively adjusting the internal energy levels of the precursor ions (with their corresponding vibrational modes and probable instabilities) as they enter the fragmentation region.

SUMMARY OF THE INVENTION

The present invention provides for molecular activation of ions in a tandem mass spectrometer prior to fragmentation.

According to one embodiment, the present invention comprises a tandem mass spectrometer that includes a first collision cell receiving analyte ions having an internal energy and a second collision cell situated downstream from the first collision cell, wherein the first collision cell increases the internal energy of the analyte ions prior to entry of the ions into the second collision cell, the increase in internal energy imparted in the first collision cell alone being insufficient to fragment a substantial portion of the analyte ions.

According to another embodiment, the present invention comprises a tandem mass spectrometer comprising a collision cell and a heating device situated adjacent to the collision cell.

Included in the present invention is a method of controlling a fragmentation process in a tandem mass spectrometer that includes heating analyte ions to an elevated temperature within the mass spectrometer and fragmenting the analyte ions at the elevated temperature, wherein the elevated temperature alone does not impart sufficient internal energy to cause fragmentation of a substantial portion of the analyte ions.

DETAILED DESCRIPTION

Before describing the present invention in detail, it is noted that, as used in this specification and the appended claims, the singular forms "a," "an," and "the" include plural referents unless the context clearly dictates otherwise.

The term "adjacent" as used herein means near, next to or adjoining. Something adjacent may also be in contact with another component, surround (i.e. be concentric with) the other component, be spaced from the other component or contain a portion of the other component.

At the outset, it is noted those skilled in the art of tandem mass spectrometry refer to ions before they are fragmented in a collision cell variously as parent ions or precursor ions, and the fragments of these ions generated by collisions as either daughter ions or product ions. The description herein uses solely the terms precursor and product ions, but it is to be understood that these terms have the same meaning as parent and daughter ions as used in similar contexts by those skilled in the art.

Figure 1:
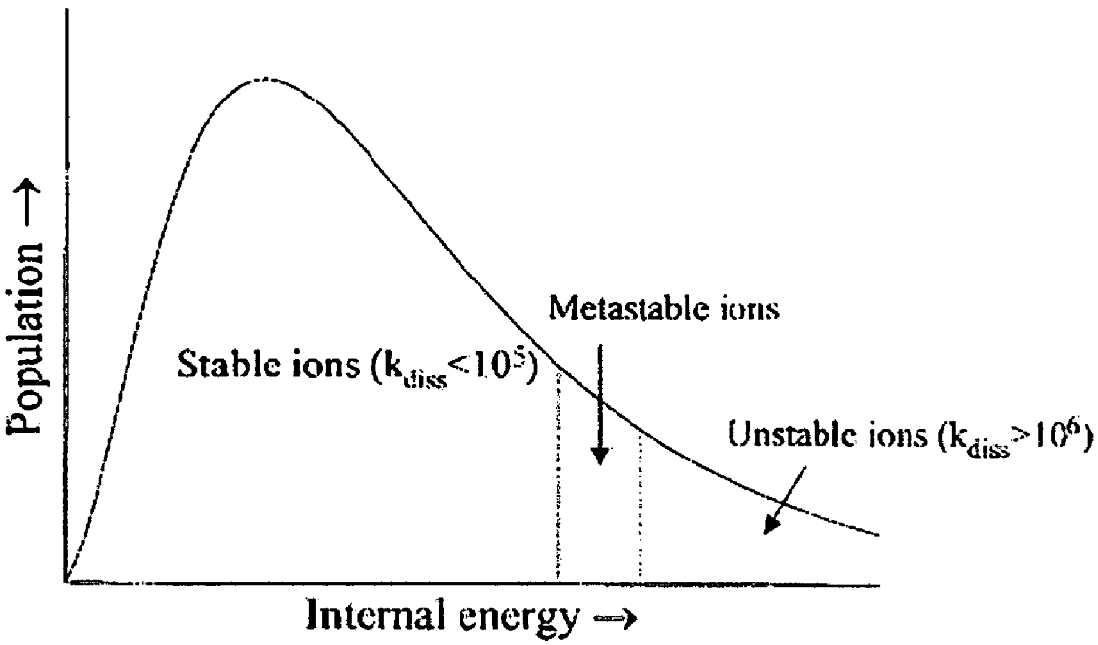
FIG. 1 is an exemplary graph that illustrates an expected distribution of internal energies of precursor ions in a mass spectrometer instrument.
Figure 2:
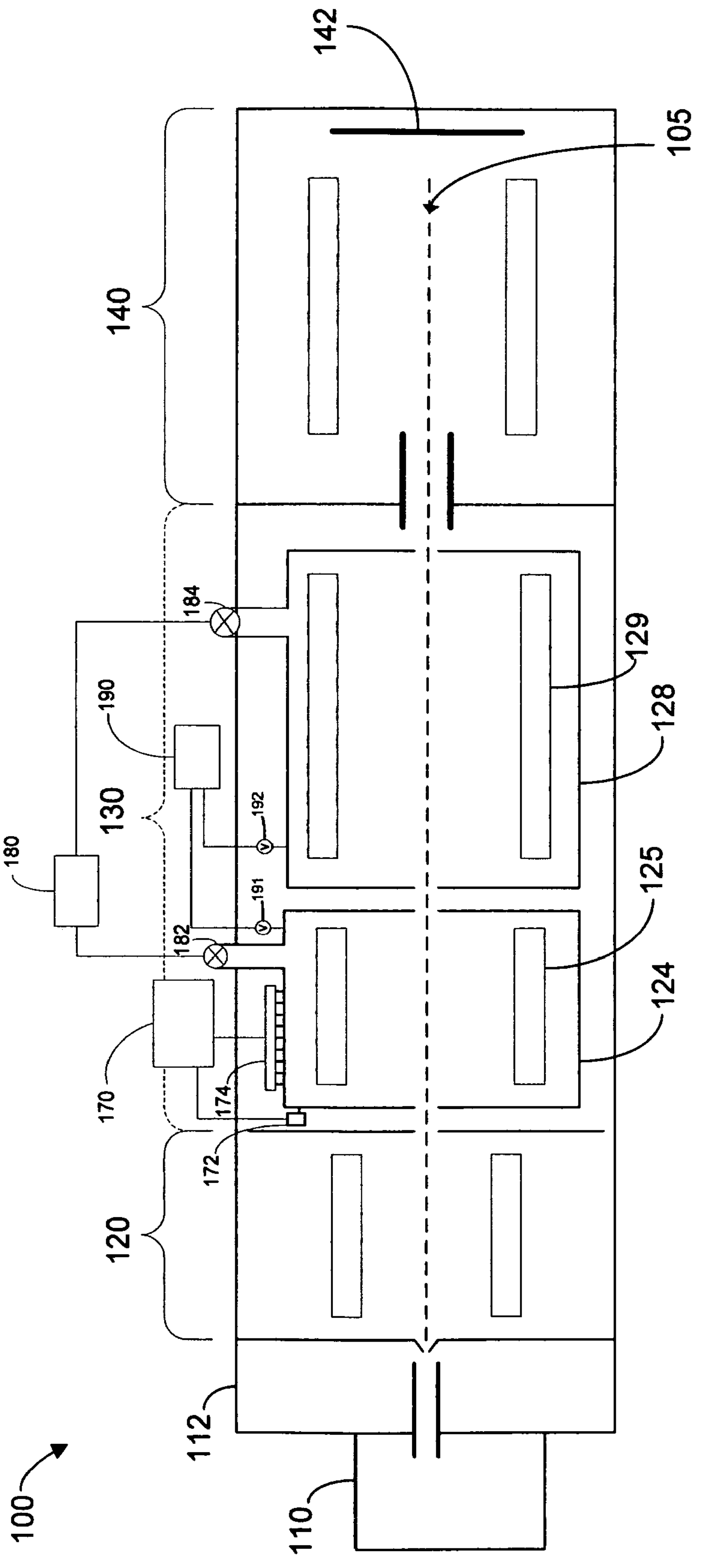
FIG. 2 is a cross-sectional view of an embodiment of a tandem mass spectrometer according to the present invention.

FIG. 2 shows a cross-sectional view of an exemplary tandem mass spectrometer (MS/MS) system according to the present invention that provides for molecular activation and thermalization of precursor ions. The term 'thermalization' of the precursor ions refers to the equilibration of the internal states of the precursor ions at a given temperature. The system 100 includes an ion source 110 that can include any apparatus or mechanism for the production of precursor ions from an analyte sample known in the art, including atmospheric pressure ionization mechanisms such as electrospray, APCI (Atmospheric Pressure Chemical Ionization), APPI (Atmospheric Pressure Photoionization), AP-MALDI, or non-atmospheric ion sources such as electron impact and plasma ionization mechanisms. Precursor ions generated in the ion source 110 are guided into a capillary or orifice which leads into one or more vacuum stages 112. Although for simplicity only one vacuum stage is depicted, it is to be understood that in general, there may be several vacuum stages between the ion source 110 and the first stage mass analyzer, and each may include ion guides and/or focusing lenses to focus ions toward the central axis 105 of the mass spectrometer. Between the vacuum stages the pressure generally drops one or more orders of magnitude, as neutral gases are pumped out, while the ions largely remain focused near the central axis due to the RF electric field maintained on the ion guides within the vacuum stages.

As noted above, ions created at atmospheric pressure in ion source 110 generally undergo a supersonic expansion as they enter the first vacuum stage 112 and their internal energy drops to a low level. The low internal energy state of the ions is maintained as they travel to successive vacuum stages and the pressure drops further, reducing the probability of collisions. However, the kinetic energy of the ions may be high depending on the potential offsets between the vacuum stages and between the last vacuum stage and the first mass analyzer since ions may pick up kinetic energy as they are accelerated by the potential differences.

The first mass analyzer stage 120 may comprise a quadrupole mass filter, a linear or three-dimensional (3D) ion trap, an orbitrap, a time-of-flight (TOF) or any other suitable mass analyzer known in the art. Both RF and DC fields are applied to the first stage mass analyzer 120 to select precursor ions by fixing or scanning a range of m/z ratios. The precursor ions that are permitted to pass through the mass analyzer 120 are then transmitted to a collision stage 130. In the embodiment of FIG. 2, the collision stage 130 includes a first collision cell 124 in which the precursor ions are activated and heated by collisions with a collision gas present in the cell, and a second collision cell 128 in which precursor ions that have been activated in the first collision cell are fragmented.

Product ions resulting from fragmentation are then scanned using the second stage mass analyzer 140 which includes a detector 142. It is to be noted however, that the experimental mode described, a product ion scan, is only one of a number of experimental modes in which the present invention may be applied, including, for example, precursor ion scans and neutral loss scans.

In the first collision cell 124, the ions are subjected to collisions with neutral gas molecules. As discussed, for example, in U.S. Pat. No. 6,919,562 to Whitehouse et al., this process generally leads to collisional cooling, whereby the kinetic energy of the ions is reduced. Collisional cooling has the benefit that the radial component of the ion velocity is reduced, and the ions are therefore focused more closely along the central axis 105 of the spectrometer. As noted above, during collisions with the neutral gas atoms or molecules, some of the kinetic energy of the ions is converted to internal energy. This conversion will continue until the ions are thermalized, i.e., their internal energy state distribution corresponds to the background collision gas temperature within the collision cell. This background temperature may be in a range of from 0 to 500 degrees Celsius, for example. The temperature may be controlled in a closed loop fashion using an electronic temperature (thermal) control unit 170 that monitors a temperature sensor 172 coupled the first collision cell 124, and activates or deactivates a heating unit 174 coupled to the cell depending on the signals received from the temperature sensor to reach and/or maintain a set temperature.

The collision rate is also affected by both the pressure of the collision gas and the length of the first collision cell 124, which both contribute in determining the number of collisions per transported ion. In general, the collision gas may be maintained at a pressure of about 0.1 mtorr-50 mtorr, but this range should not be regarded as a limitation on the scope of the claimed invention(s). The pressure of the collision gas in both the first and second collision cells 124, 128 may be controlled by an electronic pressure control unit 180 in a closed loop fashion using pressure sensors 182, 184. The pressure control unit 180 can control one or more valves and thereby gas flows in response to the signals received from the pressure sensors 182, 184. The pressure sensors 182, 184 may be positioned either within the first and second collision cells 124, 128 or within the respective chambers 120, 130 enclosing the collision cells. The pressures within chambers 120, 130 are typically at somewhat lower pressures than the collision cells 124, 128. In the case where the sensors are positioned within the chambers 120, 130, the pressure readings may be calibrated to the chamber pressures since they are linearly related.

In the depicted embodiment, the first collision cell 124 includes a multipole arrangement 125 (i.e., quadrupole, hexapole, octapole, etc.) with RF-only applied on the set of electrode rods. It is noted however, that the first collision cell 124 can also comprise an ion trap configuration. In particular, ion traps may be suitable for "slow heating" of precursor ions, because ions remain within the collision chamber much longer when these configurations are used in comparison to non-trapping configurations. An embodiment of a mass spectrometer including a first collision cell which acts as a linear ion trap is shown in FIG. 3.

Figure 3:
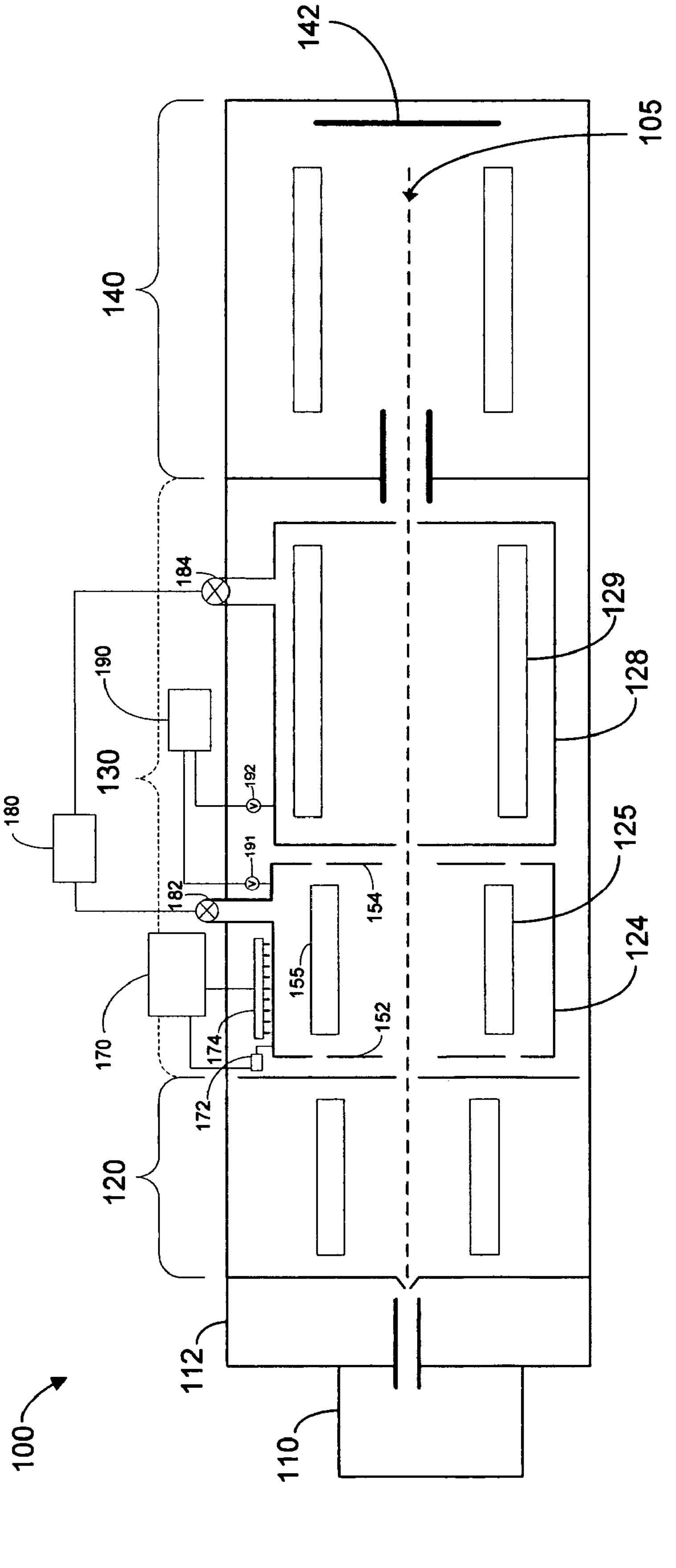
FIG. 3 is a cross-sectional view of an embodiment of a tandem mass spectrometer according to the present invention including an ion trapping collision cell.

As shown, the first collision cell 124 in the embodiment of FIG. 3 includes a multipole arrangement 155 and apertured electrodes 152 and 154. The voltages on the apertured electrodes 152, 154 are controlled so as to trap the ions within the cell for a specified length of time. To fill the cell, the potential on the entrance electrode 152 is lowered, and the potential at the exit electrode can be raised. Since the length of time that the ions remain within the first collision cell is determined by the potentials on the apertures, more time may be made available for equilibrating the internal energy of the ions to the background level by trapping.

In either or both of the embodiments of FIGS. 2 and 3, an axial electric field can be used to increase or maintain the kinetic energy of the precursor ions. When a multipole arrangement is employed in the first collision cell 124, the rod set may be configured so that an axial DC electric field is generated internally along the axis of the multipole set of about 0.1 to about 5 Volts/cm. U.S. Pat. No. 5,847,386 to Thomson et al. describes several techniques for producing an axial DC electric field using a multipole set. The present invention may make use of any of the techniques described therein including without limitation: tapered multipole rods, inclined multipole rods, segmented rods with resistors and independent voltage sources, auxiliary electrodes positioned between the multipole rods having resistive surface layers, coating the multipole rods with resistive material or dividing them into sections with conductive bands, etc. The axial field may be alternating, which promotes a greater number of collisions without having to increase the pressure of the collision gas. This may be accomplished by applying an oscillating (i.e., alternating between positive and negative) potential to the multipole set.

An offset voltage is applied between the first collision cell 124 and the second collision cell 128 to accelerate the ions downstream. To establish the offset voltage independent voltage sources 191, 192 may be coupled to the first and second collision cells 124, 128 or a single voltage source may be coupled to both collision cells through a voltage divider circuit. A voltage control unit 190 may be coupled to the voltage sources so enable the potentials to be adjustably set on each of the collision cells 124, 128. The term "voltage source" in this case should be interpreted broadly. For instance, a voltage source need not be an actual electrical power supply. It might be simply a connection to ground or to another conductor at a definite potential. For a given potential difference, the electric field is the same regardless of absolute potentials. Thus, a 'voltage source", as the term is used herein is anything that establishes the potential on whatever it is coupled to. The voltage source may be electronically or manually adjustable so as to control the magnitude of the potential applied.

As the precursor ions exit from the first collision cell 124 a significant proportion of the ions are thermalized and their internal energy distribution and temperature is equilibrated with the background collision gas. Thus, the second collision cell 128 receives mostly thermalized ions with a wide distribution of internal energy states. These ions will have a greater probability of fragmenting in response to further collisions in the second collision cell. Moreover, by controlling the distribution of internal energy states of the precursor ions, the types of fragmentation that occur can be varied, since different chemical bonds within an ion tend to fragment differently depending on the particular dominant vibrational/electronic energy modes. Upon fragmentation, the precursor ions may break up into different product ion and neutral species depending on the internal energy state population of the precursors. The product ions are guided by a multipole guide 129.

The second mass analyzer 140, which includes a detector 142, may comprise a quadrupole, ion trap, orbitrap, TOF or a combination of these components in a tandem arrangement. In combination with the scan mode used on the first mass analyzer, the mode employed on the second mass analyzer determines the type of investigation performed by the mass spectrometer 100. In particular, there are at least four different combined modes: if the m/z ratio selected by the first mass analyzer 120 is fixed and the second mass analyzer 140 is scanned, the result is detection of an entire range of product ions for a particular precursor ion ('Product Ion Scan'); conversely, if the first mass analyzer is scanned and the second mass analyzer fixed, a range of precursors is tested to determine whether a particular product can be derived from the group of precursors via fragmentation ('Precursor Ion Scan'); if both the first and second mass analyzers are scanned (with an offset), then precursor and product ion pairs having a defined offset can be analyzed; if both the first and second mass analyzers are fixed, then a selective reaction monitoring mode is set up whereby it is determined whether fragmentation of a particular precursor ion results in a particular product ion.

Figure 4:
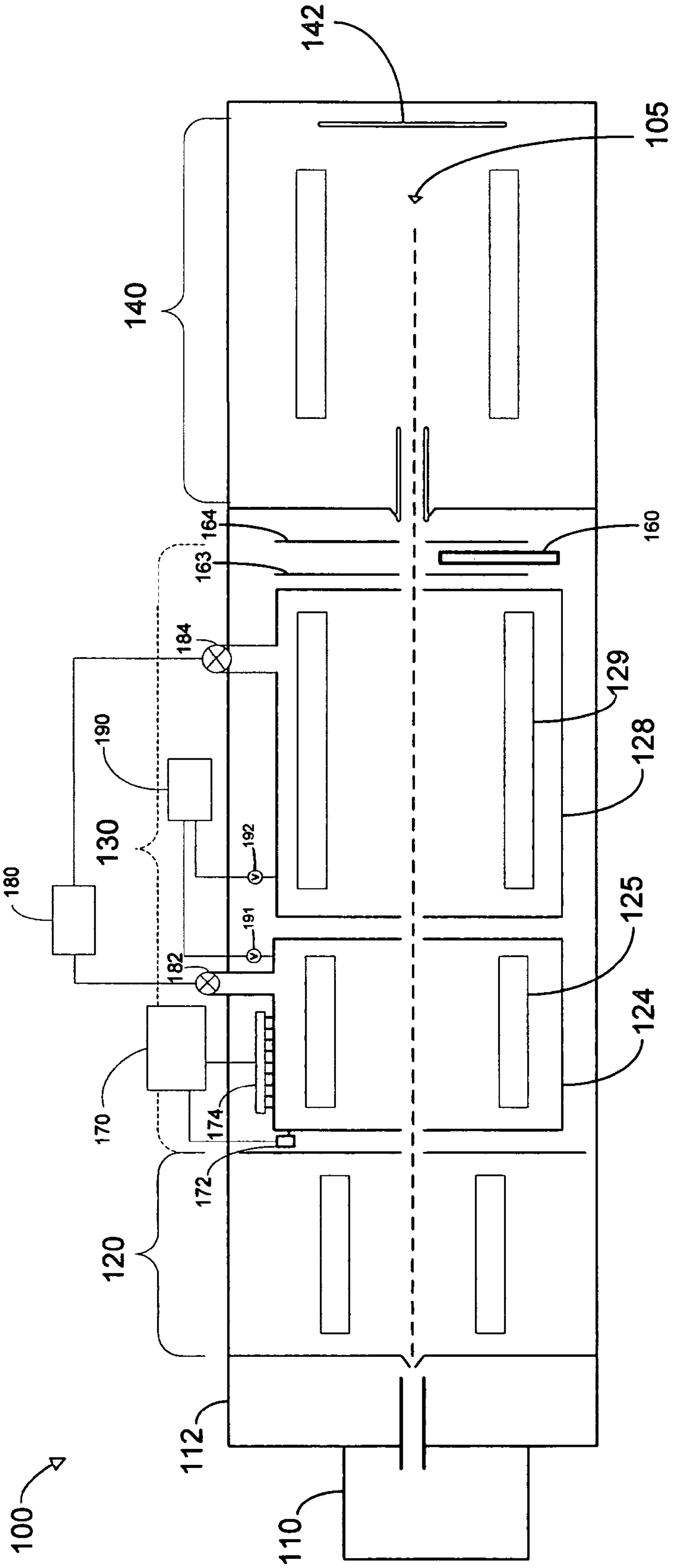
FIG. 4 is a cross-sectional view of another embodiment of a tandem mass spectrometer according to the present invention that includes an electron source for electron-capture activation.

FIG. 4 shows a further embodiment of a tandem mass spectrometer according to the present invention in which, instead of collisional activation (or in addition to collisional activation), the precursor ions are fragmented using electron-capture activation and dissociation (which may be referred to in abbreviated form as DEA or ECD). An electron source 160 is positioned near the exit of the second collision cell 128. The electron source 160 may include a housing which is held at the same potential as lens elements 163, 164 which are positioned on either side of the electron source longitudinally. As discussed, for example, in U.S. Pat. No. 6,919,562 to Whitehouse et al., a number of different types of electron sources may be used in this context, including, but not limited to: a heated filament, an indirectly heated cathode dispenser, a photon source in combination with photosensitive materials, and an electron gun, etc. It is noted, however, that other methods for introducing electrons into the second collision cell may equally be used in the context of the present invention, and that the schemes discussed in Whitehouse et al. are merely exemplary.

The electron source preferably generates a large flux of low energy electrons in the range from about 0.2 to about 5 eV. The electrons emitted from the source 160 enter a field free region between lenses 163 and 164. Thereafter, lens 164 can be pulsed to a voltage more negative than lens 163, which repulses the electrons through lens 163 toward the exit of the second collision cell 128. The potential difference between lens 163 and the offset potential of the first collision cell 128 then attracts the electrons into the second collision cell. In both the first and second collision cells 124, 128 collisional cooling reduces the kinetic energy of the precursor ions and focuses them toward the central axis 105 of the mass spectrometer. The concentration of ions along the axis creates a space charge effect in this area which attracts the electrons introduced into the second collision cell 128 and the reduced velocity of the ions increases the efficiency of electron capture.

ECD differs from collision-induced activation in that electron capture typically involves electronic state interactions rather than vibrational or rotational state excitations. It is believed that ions undergo structural rearrangement following the capture of a low energy electron which leads to structural instability. The type of structural instability caused by electron capture can be different from the structural instabilities caused by collisional activation, with the result that different fragmentation patterns can emerge from collisions in the second collision cell 128 depending on the activation mode employed. In particular, ECD is strongly influenced by the internal energy of the precursor ions. Thus, heating the ions can result in considerable differences in the resulting fragmentation patterns. For example, it is found that electron capture can facilitate the fragmentation of peptide backbone amine bonds (CαN bonds) whereas collisional activation often does not strongly affect such bonds. Electron-capture activation is at least a good complement to collisional activation in cases where such bonds are being investigated. In addition, electron transfer dissociation can be employed as well in which electrons are injected into neutral molecules to create negative ions prior to or within the second collision cell, and the negative ions then transfer an electron to other molecules by chemical ionization.

Figure 5:
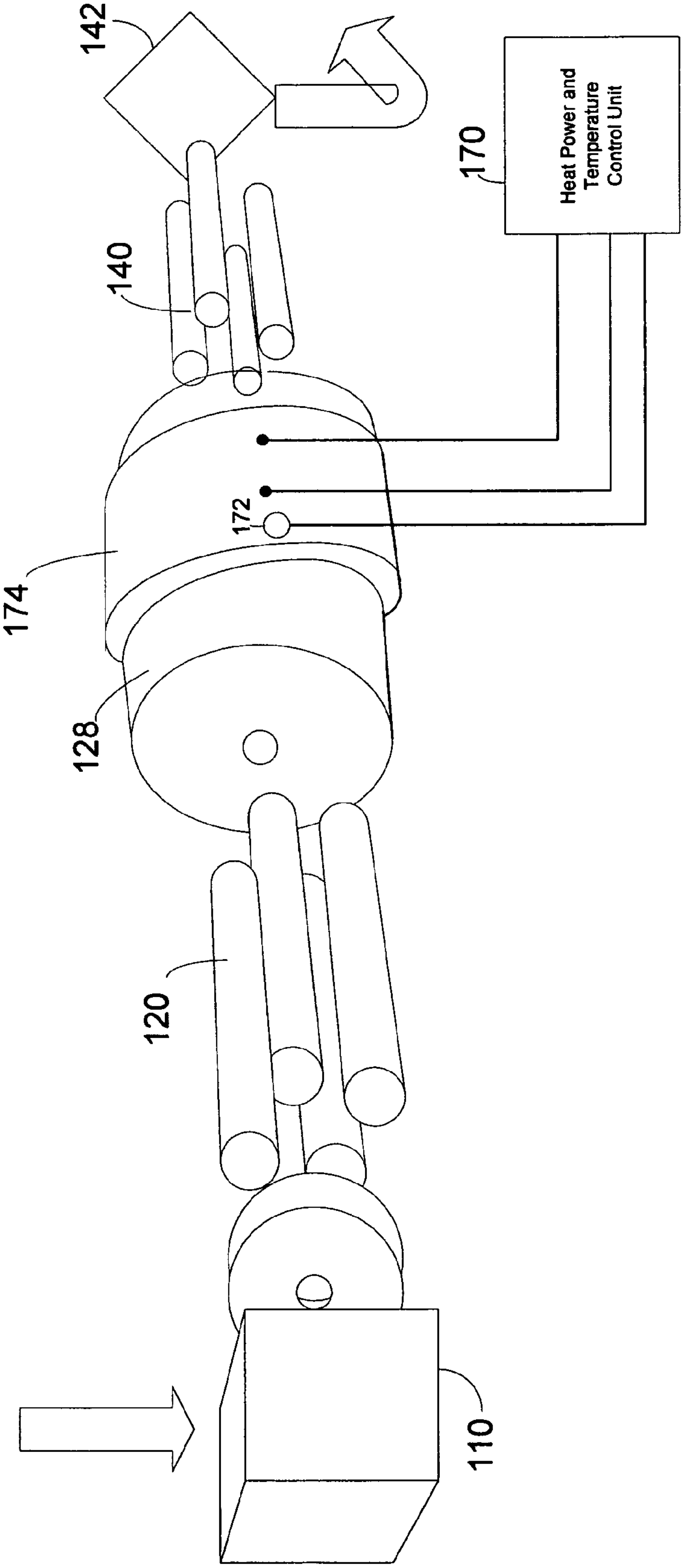
FIG. 5 is a perspective view of an alternative embodiment of a tandem mass spectrometer according to the present invention.

FIG. 5 shows a perspective view of another embodiment of a tandem mass spectrometer according to the present invention, in which rather than using a first collision cell to activate precursor ions prior to their entry into the main collision cell, a heating element ("heater") 174 is positioned adjacent to the collision cell 128, which in this embodiment includes a single collision cell in which both activation and fragmentation take place. The heater 174 may be positioned and constructed in a variety of different configurations and geometries, and in the exemplary embodiment depicted is configured as a sleeve circumferentially surrounding a portion of the length of the collision cell. In general, the heater 174 may be adjacent to or may partially or completely surround the collision cell.

The heater 174 receives an electrical current controlled by electronic control unit 170. The control unit 170 receives as input temperature measurement signals generated by a thermal sensor 172 which may be in contact with the outer surface of the collision cell 128, or may contact the heater alone. In a closed loop fashion, the control unit can adjust the amount of current supplied to the heater so as to achieve a desired set temperature depending on the temperature signals it receives from the thermal sensor 172. The heater 174 preferably provides enough heat to raise the temperature within the collision cell 128 to at least between 0 and 500 degrees Celsius. The heat applied to the collision cell (which may be a heat conductive material such as a metal) is transferred to the collision gas, and the internal energy states of the precursor ions are gradually brought into equilibrium with the collision gas.

Having described the present invention with regard to specific embodiments, it is to be understood that the description is not meant to be limiting since further modifications and variations may be apparent or may suggest themselves to those skilled in the art. It is intended that the present invention cover all such modifications and variations as fall within the scope of the appended claims.

What is claimed is:

1. A tandem mass spectrometer comprising:

a first collision cell receiving analyte ions having an internal energy; and a second collision cell situated downstream from the first collision cell;

wherein the first collision cell increases the internal energy of the analyte ions prior to entry of the ions into the second collision cell, the increase in internal energy imparted in the first collision cell alone being insufficient to fragment a substantial portion of the analyte ions.

2. The tandem mass spectrometer of claim 1, wherein the first collision cell includes a collision gas.

3. The tandem mass spectrometer of claim 2, further comprising:

a collision gas pressure sensor coupled to the first collision cell; and a collision gas pressure control unit coupled to a collision gas pressure valve and the collision gas pressure sensor for adjusting the internal energy of the analyte ions by establishing a set pressure within the first collision cell.

4. The tandem mass spectrometer of claim 1, wherein the first collision cell includes an axial electric field.

5. The tandem mass spectrometer of claim 4, wherein the first collision cell includes a multipole rod set for generating the axial electric field.

6. The tandem mass spectrometer of claim 4, wherein the axial field is used to vary a kinetic energy of the analyte ions.

7. The tandem mass spectrometer of claim 1, further comprising:

a voltage control unit coupled to the first collision cell for applying a controllable offset voltage to the first collision cell;

wherein a kinetic energy of analyte ions can be adjusted by varying the offset voltage via the voltage control unit.

8. The tandem mass spectrometer of claim 1, wherein the first collision cell is heated to between about 0 and about 500 degrees Celsius.

9. The tandem mass spectrometer of claim 1, further comprising:

a temperature sensor coupled to one of the first and second collision cells;

a temperature control unit coupled to the temperature sensor; and a heating element unit adjacent to one of the first and second collision cells and coupled to the temperature control unit;

wherein the temperature control unit regulates a temperature within the corresponding collision cell in a closed loop by receiving signals from the temperature sensor and transmitting signals to the heating element.

10. The tandem mass spectrometer of claim 9, wherein the temperature sensor is coupled to and the heating element is adjacent to the second collision cell in which fragmentation takes place.

11. The tandem mass spectrometer of claim 1, further comprising:

an electron source adjacent to the second collision cell; and means for guiding electrons from the electron source into the second collision cell.

12. A tandem mass spectrometer comprising:

a collision cell; and a heating device situated adjacent to the collision cell.

13. The tandem mass spectrometer of claim 12, further comprising:

a temperature sensor for measuring a temperature within the collision cell; and a controller coupled to the temperature sensor and the heating device, the controller receiving a measurement from the temperature sensor and controlling the heating device in accordance with the received measurement to reach a set temperature.

14. The tandem mass spectrometer of claim 13, wherein the controller adjusts the temperature within the collision cell to a set value within a range of about 0 to about 500 degrees Celsius.

15. The tandem mass spectrometer of claim 12, wherein the heating device is coupled to an outer surface of the collision cell.

16. The tandem mass spectrometer of claim 15, wherein the heating device comprises a cylindrical sleeve at least partially surrounding the collision cell.

17. A tandem mass spectrometer comprising:

means for heating analyte ions with a collision gas at an elevated temperature; and means for fragmenting the analyte ions at the elevated temperature;

wherein the heating of the analyte ions alone does not provide sufficient internal energy to fragment a substantial portion of the analyte ions.

18. The tandem mass spectrometer of claim 17, wherein the means for heating the analyte ions to an elevated temperature comprises a first collision cell, and the means for fragmenting the analyte ions at the elevated temperature comprises a second collision cell situated downstream from the first collision cell.

19. The tandem mass spectrometer of claim 17, wherein the means for fragmenting the analyte ions comprises a collision cell, and the means for heating the analyte ions to an elevated temperature comprises a heating device situated adjacent to the collision cell.

20. The tandem mass spectrometer of claim 19, wherein the heating device is coupled to an outer surface of the collision cell.

21. The tandem mass spectrometer of claim 20, wherein the heating device comprises a cylindrical sleeve surrounding the collision cell.

22. The tandem mass spectrometer of claim 17, further comprising:

means for monitoring the elevated temperature; and means for controlling heating so as to reach a set elevated temperature.

23. A tandem mass spectrometer comprising:

an ion source for generating analyte ions;

a first mass analyzer situated downstream from the ion source;

a first collision cell situated downstream from the first mass analyzer;

a second collision cell situated downstream from first collision cell;

a second mass analyzer situated downstream from the second collision cell; and a detector situated downstream from the second mass analyzer;

wherein the first collision cell increases an internal energy of the analyte ions prior to entry of the analyte ions into the second collision cell.

24. The tandem mass spectrometer of claim 23, wherein the first collision cell includes a collision gas having a temperature in a range of about 0 to about 500 degrees Celsius.

25. The tandem mass spectrometer of claim 24, further comprising:

a collision gas pressure sensor coupled to the first collision cell; and a collision gas pressure control unit coupled to the collision gas pressure sensor for controlling a pressure of the collision gas within the first collision cell in response to signals received from the collision gas pressure sensor to reach a set pressure.

26. The tandem mass spectrometer of claim 23, wherein the first collision cell includes an axial electric field.

27. The tandem mass spectrometer of claim 26, wherein the axial electric field is alternating.

28. A method of controlling a fragmentation process in a tandem mass spectrometer comprising:

heating analyte ions to an elevated temperature within the mass spectrometer; and fragmenting the analyte ions at the elevated temperature;

wherein the heating of the analyte ions to the elevated temperature does not alone impart sufficient internal energy to cause fragmentation of a substantial portion of the analyte ions.

29. The method of claim 28, wherein the heating of the analyte ions is performed in a first collision cell and the fragmenting is performed in a second collision cell downstream from the first collision cell.

30. The method of claim 28, wherein the fragmenting is performed in a collision cell of the mass spectrometer and the heating of the analyte ions is also performed at the collision cell.

31. The method of claim 28, further comprising:

monitoring the elevated temperature; and controlling the heating to reach a set elevated temperature.

32. The method of claim 29, further comprising:

subjecting the analyte ions to an axial electric field in the first collision cell.

33. The method of claim 32, further comprising:

providing the axial electric field using a multipole rod set having an axis along which a potential gradient is generated.

34. The method of claim 32, wherein the axial electric field is alternating.

35. The method of claim 32, further comprising:

applying electric potentials at axial ends of the first collision cell to trap the analyte ions.

36. The method of claim 33, further comprising:

applying a controllable offset voltage to the multipole red set;

wherein a kinetic energy of the analyte ions can be adjusted by varying the offset voltage.

37. The method of claim 32, further comprising:

controlling a magnitude of the axial field within the first collision cell;

wherein a kinetic energy of the analyte ions traveling through the collision cell can be adjusted by varying the magnitude of the axial field.

38. The method of claim 29, further comprising:

introducing electrons into the second collision cell;

wherein the electrons cause the fragmenting of a portion of the analyte ions within the second collision cell.

* * * * *